United States Patent
Sezer et al.

(10) Patent No.: US 11,001,668 B2
(45) Date of Patent: May 11, 2021

(54) SYNTHESIS OF POLYGLYCOLIC ACID WITH HIGH MOLECULAR WEIGHT AND HIGH SOLUBILITY AT LOW COST

(71) Applicant: TUBITAK, Ankara (TR)

(72) Inventors: Serdar Sezer, Isparta (TR); Umran Aydemir Sezer, Isparta (TR); Vildan Sanko, Kocaeli (TR)

(73) Assignee: TUBITAK, Ankara (TR)

( * ) Notice: Subject to any disclaimer, the term of this patent is extended or adjusted under 35 U.S.C. 154(b) by 14 days.

(21) Appl. No.: 16/482,251

(22) PCT Filed: Feb. 8, 2018

(86) PCT No.: PCT/IB2018/050785
§ 371 (c)(1),
(2) Date: Jul. 31, 2019

(87) PCT Pub. No.: WO2018/146614
PCT Pub. Date: Aug. 16, 2018

(65) Prior Publication Data
US 2020/0002469 A1     Jan. 2, 2020

(30) Foreign Application Priority Data
Feb. 10, 2017 (TR) ................. 2017/02016

(51) Int. Cl.
| C08G 63/06 | (2006.01) |
| C08G 63/78 | (2006.01) |
| C08G 63/81 | (2006.01) |
| C08G 63/85 | (2006.01) |
| C08G 63/87 | (2006.01) |

(52) U.S. Cl.
CPC ........... C08G 63/06 (2013.01); C08G 63/785 (2013.01); C08G 63/81 (2013.01); C08G 63/85 (2013.01); C08G 63/87 (2013.01)

(58) Field of Classification Search
USPC .......................... 528/298, 300, 361
See application file for complete search history.

(56) References Cited

U.S. PATENT DOCUMENTS

| 5,310,865 A | 5/1994 | Enomoto |
| 5,770,683 A | 6/1998 | Yoshida |
| 8,039,548 B2 * | 10/2011 | Ogawa .................. C07C 51/44 |
| | | 524/600 |

FOREIGN PATENT DOCUMENTS

| EP | 0368571 | 5/1990 |
| EP | 0678018 | 5/1994 |
| JP | 3350210 | 11/2002 |

OTHER PUBLICATIONS

ISR, dated Apr. 18, 2018.

* cited by examiner

*Primary Examiner* — Terressa Boykin
(74) *Attorney, Agent, or Firm* — Crose Law LLC; Bradley D. Crose

(57) ABSTRACT

The invention relates to the synthesis method of polyglycolic acid (PGA) obtained by removing the excessive water and monomer formed subsequent to condensation by means of an organic solvent and using azeotropic distillation method in the presence of a catalyst. The invention is a synthesis method of polyglycolic acid with high molecular weight and high solubility, characterized by comprising the steps of placing the glycolic acid in reaction medium with a catalyst; using hydrophilic organic solvents for removing the excessive water and monomer formed during condensation; mixing and boiling the mixture; stabilizing the amount of solvent in reaction medium and distilling the water off by means of Dean stark apparatus and/or a similar apparatus; refluxing the solid polymer obtained at the end of the reaction with ethyl acetate and removing the same from monomer residue and catalyst.

4 Claims, No Drawings

SYNTHESIS OF POLYGLYCOLIC ACID WITH HIGH MOLECULAR WEIGHT AND HIGH SOLUBILITY AT LOW COST

TECHNICAL FIELD OF THE INVENTION

The present invention relates to the synthesis method of polyglycolic acid (PGA) with high molecular weight and high solubility at lower costs and using more appropriate synthesis parameters.

The invention particularly relates to the synthesis method of PGA obtained by removing the excessive water and monomer formed subsequent to condensation by means of an organic solvent and using azeotropic distillation method in the presence of a catalyst.

PRIOR ART

The PGA obtained by the polymerization of glycolic acid present in alpha hydroxy acid group is aliphatic polyester [Soni 2010$_{(1)}$, Singh 2010$_{(2)}$, Ha 1981$_{(3)}$]. Its use, especially in medical field, has become widespread due to the biocompatible and biodegradable properties thereof in addition to the fact that its degradation products are not toxic [Rovshandeh 2001]$_{(23)}$ and it has good mechanical properties [Moon 2004]$_{(25)}$, and that it is a polymer approved by the American Food and Drug Administration (FDA) [Shen 2013$_{(4)}$, Montes 2006$_{(5)}$]. The first time it was used in this field is the synthetic, absorbable suture (Dexon®) which was developed by DuPont chemical company in 1962 and has been commercially available since 1970 [Gilding1979$_{(6)}$, Singh 2010$_{(2)}$, Soni 2010$_{(1)}$, Cooper 1973$_{(7)}$, Marega 1992$_{(8)}$]. Being a very important polymer for biomedical applications, PGA is also used, apart from sutures, in many fields including drug release systems, tissue scaffold structures, single use medical devices and so on [Lu 2014$_{(9)}$, Schmidt 2014$_{(10)}$]. Its use in packaging applications has also become more and more widespread since it has 100 folds better barrier quality than polyethylene terephthalate (PET) (Kuredux) [Gokturk2015]$_{(11)}$.

Owing to its simple chemical structure and three dimensional regulation, it has a wide crystallinity range from amorphous structure to a very crystalline structure [Singh 2010$_{(2)}$, Soni 2010$_{(1)}$, Gokturk 2015$_{(11)}$]. It has been stated in the literature that it has, when subject to thermogravimetric analysis, a glass transition temperature ($T_g$) [Singh2010]$_{(2)}$ in the range of 35-40° C. and a melting point in the range of 220-230° C. [Soni2010]$_{(1)}$.

The degradation of PGA in the body occurs by hydrolysis [Hurrell 2001$_{(12)}$, Montes 2006$_{(5)}$, Shen 2013$_{(4)}$]. However, its use is limited due to the fact that its hydrolysis rate is higher when compared to other biodegradable polymers, e.g. polylactic acid (PLA) [Nieuwenhuis1992]$_{(13)}$. The degradation time changes depending on the weight and crystallinity degree of the polymer, this range is several weeks for PGA [Perrin-1997]$_{(21)}$. This, in turn, makes the synthesis of PGA, which as a high molecular weight, quite important. In order to obtain PGA, polymerization can be performed starting with the glycolic acid in linear form, or glycol with a ringed diester structure, as monomer. The ability to start with monomers with different structures has led to different polymerization methods. During the polymerization performed by direct condensation of the glycolic acid with linear structure, the water formed in the reaction medium affects the reaction yield and it is quite to remove the thus formed water from the reaction medium. And this prevents the molecular weight of the polymer from increasing. Nevertheless, Takashaki et al. obtained PGA with high molecular weight in their two-stage reaction systems [Takahashi-2010]$_{(14)}$. This study is disadvantageous in that the method requires such parameters as high temperature and high pressure in reaction conditions, the obtained product has a brown-dark brown color, and that the reaction time takes long hours. In some other studies, direct condensation polymerizations using ionic liquids [Dali2006]$_{(15)}$ and clay, clay/antimony trioxide [Murugan2008]$_{(16)}$ were performed; however, PGA at oligomer level was obtained. The most common polymerization method used for high molecular weight PGA is the ring opening polymerization of glycolic acid dimer [Singh2010$_{(2)}$, Kaitian1996$_{(24)}$]. In this method, 1-butanol, 1-hexanol, 1-decanol, 1-dodecanol [Kaihara-1997$_{(17)}$], 1-tetradecanol, 1-hexadecanol, 1-octadecanol, 1-eicosanol, 1-docosanol [Baez-2011$_{(18)}$], 1,4-butanediol [Gautier2009]$_{(19)}$ were used as promoter; and tin(2)2-ethylhexanoate, $(NH_4)_8[Mo_{10}O_{34}]$, antimony, zinc, lead and tin were used as catalyst [Soccio2010$_{(20)}$]. This method has the advantages of having a higher reaction yield and shorter reaction time. However, the ring opening reaction has such drawbacks as the high temperature parameter required for fulfilling the suitable reaction conditions and the starting material of the reaction, glycolide, being a costly chemical. Another polymerization method, "azeotropic distillation", can be used in order to eliminate the limiting reaction conditions both in molten/solid method and in ring opening reaction. This method, which can also be used for polyesters of different types such as linear aromatic polyesters [Patisson-1976$_{(29)}$], is a very simple process in that it does not require high temperature and pressure. The solvent process method for another mostly preferred polymer in biomedical applications, polylactic acid, was used by Mitsui chemical company and although it takes relatively a long time, an increase in molecular weight was observed [Kashima 1995$_{(22)}$, Kim1997$_{(28)}$, Moon2000$_{(27)}$]. This method is important in that the process in which the excessive water and monomer produced during condensation using organic solvent is removed from the reaction medium is a short, efficient, and a more cost-effective process since glycolic acid will be used as starting material [Yoshida1998$_{(30)}$], and that color change in the resulting polymer is prevented. The organic solvents to be used in this reaction may be hydrocarbon solvents such as toluene and xylene, or alternatively they may be halogenated hydrocarbon solvents, ketone, ether, ester solvents or the mixtures thereof [Kashima-1995$_{(26)}$].

The U.S. Pat. No. 5,310,865 filed on 18 Dec. 1992 within the state of the art discloses a process for preparing polyhydroxycarboxylic acid by conducting a direct dehydration condensation of a hydroxycarboxylic acid. Dean Stark apparatus was used as the reaction equipment and azeotropic distillation was performed using different solvents. In this study, a mixture of glycolic acid and lactic acid was used as hydroxycarboxylic acid. No study on the polymerization of glycolic acid only was conducted here.

Another prior art document, the U.S. Pat. No. 5,440,008 filed on 19 Apr. 1994 discloses a process for preparing polyhydroxycarboxylic acid by conducting dehydration polycondensation of hydroxycarboxylic acids in the presence or absence of a catalyst and in the presence or absence of an organic solvent. In this method, glycolic acid, lactic acid, 3-hydroxybutyric acid etc. and a mixture thereof were used as hydroxycarboxylic acid. A reactor system for stabilizing the amount of solvent and distilling the water off was used.

The fact that the molten/solid and ring opening reactions used for the synthesis of high molecular weight polyglycolic acid require high vacuum and temperature parameters and removing the polymer obtained during manufacture in industrial amounts is a challenge presents a technical problem; therefore, it has become necessary to develop the synthesis method of polyglycolic acid with high molecular weight at lower costs according to the invention.

Objects and Summary of the Invention

The object of the present invention is to provide the synthesis method of polyglycolic acid (PGA) with high molecular weight and high solubility.

Another object of the present invention is to provide the synthesis method of polyglycolic acid (PGA) at low costs.

And another object of the present invention is to provide the synthesis method of polyglycolic acid (PGA) with high molecular weight without using high vacuum and temperature parameters.

The method according to the invention is related to the high-molecular-weight-synthesis of polyglycolic acid, the use of which is common in biodegradable and biomedical materials. The polymer is obtained by removing the excessive water and monomer formed subsequent to condensation from the medium by means of an organic solvent using azeotropic distillation method in the presence of a catalyst.

DETAILED DESCRIPTION OF THE INVENTION

The invention is the synthesis method of polyglycolic acid with high molecular weight, comprising the steps of:
  placing the glycolic acid in reaction medium with a catalyst,
  mixing and boiling the mixture,
  using hydrophilic organic solvents for removing the excessive water and monomer formed during condensation,
  stabilizing the amount of solvent in reaction medium and distilling the water off by means of Dean stark apparatus and/or a similar apparatus,
  refluxing the solid polymer obtained at the end of the reaction with ethyl acetate for a certain period of time and removing the same from monomer residue and catalyst, and
  measuring the molecular weight of the resulting aliphatic polyester by gel permeation chromatography (GPC).

The invention is the synthesis method of PGA with high molecular weight, wherein it comprises distilling the solid polymer obtained at the end of the reaction with solvents for a certain period of time and removing the same from monomer residue and catalyst.

The invention is the synthesis method of PGA with high molecular weight, wherein the solubility of the polymer with high molecular weight obtained as a result of the reaction in an organic solvent, hexafluoro-2-propanol (HFIP), is between 50 and 175 mg/mL after stirring for 12-24 hours and at 25-50° C.

The polymerization of PGA, which is a biodegradable and biocompatible polymer with very good mechanical resistance and preferred in various fields including food packages and particularly medical devices, is conducted in the presence of a catalyst in an organic solvent and using Dean stark apparatus and/or a similar apparatus. The molecular weight of the resulting polymer is measured using GPC. With this method;
  a) solvents and catalysts can be recovered,
  b) a white polymer in fine powder form is obtained,
  c) a polymer with high solubility is achieved,
  d) high vacuum and temperature parameters are not used, and
  e) cost efficiency is provided using glycolic acid monomer as raw material.

Example 1

5 g of glycolic acid was weighed and placed in the reaction medium, and then 75 ml toluene was added and the water produced in the reaction medium was distilled off by stirring for 5 h at the boiling point of the solvent. Dean stark apparatus and/or a similar apparatus was/were employed in order to stabilize the amount of solvent in reaction medium and distill the water off. The solid polymer obtained at the end of the reaction was refluxed with ethyl acetate for 4-5 h and removed from monomer residue and catalyst. No catalyst was used in the first trial in order to be able to control the effect of the catalysts. The average molecular weight of the resulting aliphatic polyester was measured by GPC at 8400 Da.

Example 2

5 g of glycolic acid was weighed and placed in the reaction medium along with $SnCl_2 \cdot 2H_2O$ (tin chloride dihydrate) catalyst calculated as 1% mol of monomer, and then 75 ml toluene was added and the water produced in the reaction medium was distilled off by stirring for 5 h at the boiling point of the solvent. Dean stark apparatus and/or a similar apparatus was/were employed in order to stabilize the amount of solvent in reaction medium and distill the water off. The solid polymer obtained at the end of the reaction was refluxed with ethyl acetate for 4-5 h and removed from monomer residue and catalyst. The average molecular weight of the resulting aliphatic polyester was measured by GPC at 5400 Da.

Example 3

5 g of glycolic acid was weighed and placed in the reaction medium along with p-TSA (para toluene sulfonic acid) catalyst calculated as 1% mol of monomer, and then 75 ml toluene was added and the water produced in the reaction medium was distilled off by stirring for 5 h at the boiling point of the solvent. Dean stark apparatus and/or a similar apparatus was/were employed in order to stabilize the amount of solvent in reaction medium and distill the water off. The solid polymer obtained at the end of the reaction was refluxed with ethyl acetate for 4-5 h and removed from monomer residue and catalyst. The average molecular weight of the resulting aliphatic polyester was measured by GPC at 6100 Da.

Example 4

5 g of glycolic acid was weighed and placed in the reaction medium along with $p\text{-TSA}/SnCl_2 \cdot 2H_2O$ (1:1 n/n) catalyst calculated as 1% mol of monomer, and then 75 ml toluene was added and the water produced in the reaction medium was distilled off by stirring for 5 h at the boiling point of the solvent. Dean stark apparatus and/or a similar apparatus was/were employed in order to stabilize the amount of solvent in reaction medium and distill the water off. The solid polymer obtained at the end of the reaction was refluxed with ethyl acetate for 4-5 h and removed from monomer residue and catalyst. The average molecular weight of the resulting aliphatic polyester was measured by GPC at 11000 Da.

Example 5

5 g of glycolic acid was weighed and placed in the reaction medium along with trifluoromethanesulfonic acid catalyst calculated as 1% mol of monomer, and then 75 ml toluene was added and the water produced in the reaction medium was distilled off by stirring for 5 h at the boiling point of the solvent. Dean stark apparatus and/or a similar apparatus was/were employed in order to stabilize the amount of solvent in reaction medium and distill the water off. The solid polymer obtained at the end of the reaction was refluxed with ethyl acetate for 4-5 h and removed from monomer residue and catalyst. The average molecular weight of the resulting aliphatic polyester was measured by GPC at 6500 Da.

Example 6

5 g of glycolic acid was weighed and placed in the reaction medium along with tin (2) ethylhexanoate catalyst calculated as 1% mol of monomer, and then 75 ml toluene was added and the water produced in the reaction medium was distilled off by stirring for 5 h at the boiling point of the solvent. Dean stark apparatus and/or a similar apparatus was/were employed in order to stabilize the amount of solvent in reaction medium and distill the water off. The solid polymer obtained at the end of the reaction was refluxed with ethyl acetate for 4-5 h and removed from monomer residue and catalyst. The average molecular weight of the resulting aliphatic polyester was measured by GPC at 7400 Da.

Example 7

5 g of glycolic acid was weighed and placed in the reaction medium along with $SnCl_2.2H_2O$ catalyst calculated as 5% mol of monomer, and then 75 ml toluene was added and the water produced in the reaction medium was distilled off by stirring for 5 h at the boiling point of the solvent. Dean stark apparatus and/or a similar apparatus was/were employed in order to stabilize the amount of solvent in reaction medium and distill the water off. The solid polymer obtained at the end of the reaction was refluxed with ethyl acetate for 4-5 h and removed from monomer residue and catalyst. The average molecular weight of the resulting aliphatic polyester was measured by GPC at 10600 Da.

Example 8

5 g of glycolic acid was weighed and placed in the reaction medium along with p-TSA catalyst calculated as 5% mol of monomer, and then 75 ml toluene was added and the water produced in the reaction medium was distilled off by stirring for 5 h at the boiling point of the solvent. Dean stark apparatus and/or a similar apparatus was/were employed in order to stabilize the amount of solvent in reaction medium and distill the water off. The solid polymer obtained at the end of the reaction was refluxed with ethyl acetate for 4-5 h and removed from residue and catalyst. The average molecular weight of the resulting aliphatic polyester was measured by GPC at 8100 Da.

Example 9

5 g of glycolic acid was weighed and placed in the reaction medium along with p-TSA/$SnCl_2.2H_2O$ (1:1 n/n) catalyst calculated as 5% mol of monomer, and then 75 ml toluene was added and the water produced in the reaction medium was distilled off by stirring for 5 h at the boiling point of the solvent. Dean stark apparatus and/or a similar apparatus was/were employed in order to stabilize the amount of solvent to reaction medium and distill the water off. The solid polymer obtained at the end of the reaction was refluxed with ethyl acetate for 4-5 h and removed from monomer residue and catalyst. The average molecular weight of the resulting aliphatic polyester was measured by GPC at 8900 Da.

Example 10

5 g of glycolic acid was weighed and placed in the reaction medium along with trifluoromethanesulfonic acid catalyst calculated as 5% mol of monomer, and then 75 ml toluene was added and the water produced in the reaction medium was distilled off by stirring for 5 h at the boiling point of the solvent. Dean stark apparatus and/or a similar apparatus was/were employed in order to stabilize the amount of solvent in reaction medium and distill the water off. The solid polymer obtained at the end of the reaction was refluxed with ethyl acetate for 4-5 h and removed from monomer residue and catalyst. The average molecular weight of the resulting aliphatic polyester was measured by GPC at 14600 Da.

Example 11

5 g of glycolic acid was weighed and placed in the reaction medium along with tin (2) ethylhexanoate catalyst calculated as 5% mol of monomer, and then 75 ml toluene was added and the water produced in the reaction medium was distilled off by stirring for 5 h at the boiling point of the solvent. Dean stark apparatus and/or a similar apparatus was/were employed in order to stabilize the amount of solvent in reaction medium and distill the water off. The solid polymer obtained at the end of the reaction was refluxed with ethyl acetate for 4-5 h and removed from monomer residue and catalyst. The average molecular weight of the resulting aliphatic polyester was measured by GPC at 9400 Da.

Example 12

5 g of glycolic acid was weighed and placed in the reaction medium along with p-TSA/$SnCl_2.2H_2O$ (1:1 n/n) catalyst calculated as 1% mol of monomer, and then 75 ml toluene was added and the water produced in the reaction medium was distilled off by stirring for 20 h at the boiling point of the solvent. Dean stark apparatus and/or a similar apparatus was/were employed in order to stabilize the amount of solvent in reaction medium and distill the water off. The solid polymer obtained at the end of the reaction was subject to reflux with ethyl acetate for 4-5 h and removed from monomer residue and catalyst. The average molecular weight of the resulting aliphatic polyester was measured by GPC at 15600 Da.

Example 13

5 g of glycolic acid was weighed and placed in the reaction medium along with trifluoromethanesulfonic acid catalyst calculated as 1% mol of monomer, and then 75 ml toluene was added and the water produced in the reaction medium was distilled off by stirring for 20 h at the boiling point of the solvent. Dean stark apparatus and/or a similar apparatus was/were employed in order to stabilize the amount of solvent in reaction medium and distill the water off. The solid polymer obtained at the end of the reaction was refluxed with ethyl acetate for 4-5 h and removed from monomer residue and catalyst. The average molecular weight of the resulting aliphatic polyester was measured by GPC at 7300 Da.

Example 14

5 g of glycolic acid was weighed and placed in the reaction medium along with p-TSA/SnCl$_2$.2H$_2$O (1:1 n/n) catalyst calculated as 1% mol of monomer, and then 75 ml toluene was added and the water produced in the reaction medium was distilled off by stirring for 30 h at the boiling point of the solvent. Dean stark apparatus and/or a similar apparatus was/were employed in order to stabilize the amount of solvent in reaction medium and distill the water off. The solid polymer obtained at the end of the reaction was refluxed with ethyl acetate for 4-5 h and removed from monomer residue and catalyst. The average molecular weight of the resulting aliphatic polyester was measured by GPC at 17900 Da.

Example 15

5 g of glycolic acid was weighed and placed in the reaction medium along with trifluoromethanesulfonic acid catalyst calculated as 1% mol of monomer, and then 75 ml toluene was added and the water produced in the reaction medium was distilled off by stirring for 30 h at the boiling point of the solvent. Dean stark apparatus and/or a similar apparatus was/were employed in order to stabilize the amount of solvent in reaction medium and distill the water off. The solid polymer obtained at the end of the reaction was refluxed with ethyl acetate for 4-5 h and removed from monomer residue and catalyst. The average molecular weight of the resulting aliphatic polyester was measured by GPC at 16500 Da.

Example 16

5 g of glycolic acid was weighed and placed in the reaction medium along with SnCl$_2$.2H$_2$O catalyst calculated as 1% mol of monomer, and then 75 ml anisole was added and the water produced in the reaction medium was distilled off by stirring for 5 h at the boiling point of the solvent. Dean stark apparatus and/or a similar apparatus was/were employed in order to stabilize the amount of solvent in reaction medium and distill the water off. The solid polymer obtained at the end of the reaction was refluxed with ethyl acetate for 4-5 h and removed from monomer residue and catalyst. The average molecular weight of the resulting aliphatic polyester was measured by GPC at 8900 Da.

Example 17

5 g of glycolic acid was weighed and placed in the reaction medium along with p-TSA catalyst calculated as 1% mol of monomer, and then 75 ml anisole was added and the water produced in the reaction medium was distilled off by stirring for 5 h at the boiling point of the solvent. Dean stark apparatus and/or a similar apparatus was/were employed in order to stabilize the amount of solvent in reaction medium and distill the water off. The solid polymer obtained at the end of the reaction was refluxed with ethyl acetate for 4-5 h and removed from monomer residue and catalyst. The average molecular weight of the resulting aliphatic polyester was measured by GPC at 8100 Da.

Example 18

5 g of glycolic acid was weighed and placed in the reaction medium along with p-TSA/SnCl$_2$.2H$_2$O (1:1 n/n) catalyst calculated as 1% mol of monomer, and then 75 ml anisole was added and the water produced in the reaction medium was distilled off by stirring for 5 h at the boiling point of the solvent. Dean stark apparatus and/or a similar apparatus was/were employed in order to stabilize the amount of solvent in reaction medium and distill the water off. The solid polymer obtained at the end of the reaction was refluxed with ethyl acetate for 4-5 h and removed from monomer residue and catalyst. The average molecular weight of the resulting aliphatic polyester was measured by GPC at 27100 Da.

Example 19

5 g of glycolic acid was weighed and placed in the reaction medium along with trifluoromethanesulfonic acid catalyst calculated as 1% mol of monomer, and then 75 ml anisole was added and the water produced in the reaction medium was distilled off by stirring for 5 h at the boiling point of the solvent. Dean stark apparatus and/or a similar apparatus was/were employed in order to stabilize the amount of solvent in reaction medium and distill the water off. The solid polymer obtained at the end of the reaction was refluxed with ethyl acetate for 4-5 h and removed from monomer residue and catalyst. The average molecular weight of the resulting aliphatic polyester was measured by GPC at 27900 Da.

Example 20

5 g of glycolic acid was weighed and placed in the reaction medium along with tin (2) ethylhexanoate catalyst calculated as 1% mol of monomer, and then 75 ml anisole was added and the water produced in the reaction medium was distilled off by stirring for 5 h at the boiling point of the solvent. Dean stark apparatus and/or a similar apparatus was/were employed in order to stabilize the amount of solvent in reaction medium and distill the water off. The solid polymer obtained at the end of the reaction was refluxed with ethyl acetate for 4-5 h and removed from monomer residue and catalyst. The average molecular weight of the resulting aliphatic polyester was measured by gel permeation chromatography GPC at 6300 Da.

Example 21

5 g of glycolic acid was weighed and placed in the reaction medium along with p-TSA/SnCl$_2$.2H$_2$O (1:1 n/n) catalyst calculated as 1% mol of monomer, and then 75 ml anisole was added and the water produced in the reaction medium was distilled off by stirring for 20 h at the boiling point of the solvent. Dean stark apparatus and/or a similar apparatus was/were employed in order to stabilize the amount of solvent in reaction medium and distill the water off. The solid polymer obtained at the end of the reaction was refluxed with ethyl acetate for 4-5 h and removed from monomer residue and catalyst. The average molecular weight of the resulting aliphatic polyester was measured by GPC at 30800 Da.

Example 22

5 g of glycolic acid was weighed and placed in the reaction medium along with trifluoromethanesulfonic acid catalyst calculated as 1% mol of monomer, and then 75 ml anisole was added and the water produced in the reaction medium was distilled off by stirring for 20 h at the boiling point of the solvent. Dean stark apparatus and/or a similar apparatus was/were employed in order to stabilize the amount of solvent in reaction medium and distill the water off. The solid polymer obtained at the end of the reaction was refluxed with ethyl acetate for 4-5 h and removed from monomer residue and catalyst. The average molecular weight of the resulting aliphatic polyester was measured by GPC at 26400 Da.

Example 23

5 g of glycolic acid was weighed and placed in the reaction medium along with p-TSA/$SnCl_2$.$2H_2O$ (1:1 n/n) catalyst calculated as 1% mol of monomer, and then 75 ml anisole was added and the water produced in the reaction medium was distilled off by stirring for 30 h at the boiling point of the solvent. Dean stark apparatus and/or a similar apparatus was/were employed in order to stabilize the amount of solvent in reaction medium and distill the water off. The solid polymer obtained at the end of the reaction was refluxed with ethyl acetate for 4-5 h and removed from monomer residue and catalyst. The average molecular weight of the resulting aliphatic polyester was measured by gel permeation chromatography (GPC) at 28000 Da.

Example 24

5 g of glycolic acid was weighed and placed in the reaction medium along with trifluoromethanesulfonic acid catalyst calculated as 1% mol of monomer, and then 75 ml anisole was added and the water produced in the reaction medium was distilled off by stirring for 30 h at the boiling point of the solvent. Dean stark apparatus and/or a similar apparatus was/were employed in order to stabilize the amount of solvent in reaction medium and distill the water off. The solid polymer obtained at the end of the reaction was refluxed with ethyl acetate for 4-5 h and removed from monomer residue and catalyst. The average molecular weight of the resulting aliphatic polyester was measured by GPC at 40300 Da.

Example 25

5 g of glycolic acid was weighed and placed in the reaction medium along with trifluoromethanesulfonic acid catalyst calculated as 1% mol of monomer, and then 75 ml mesitylene was added and the water produced in the reaction medium was distilled off by stirring for 30 h at the boiling point of the solvent. Dean stark apparatus and/or a similar apparatus was/were employed in order to stabilize the amount of solvent in reaction medium and distill the water off. The solid polymer obtained at the end of the reaction was refluxed with ethyl acetate for 4-5 h and removed from monomer residue and catalyst. The average molecular weight of the resulting aliphatic polyester was measured by GPC at 22400 Da.

Example 26

5 g of glycolic acid was weighed and placed in the reaction medium along with trifluoromethanesulfonic acid catalyst calculated as 1% mol of monomer, and then 75 ml phenetole was added and the water produced in the reaction medium was distilled off by stirring for 30 h at the boiling point of the solvent. Dean stark apparatus and/or a similar apparatus was/were employed in order to stabilize the amount of solvent in reaction medium and distill the water off. The solid polymer obtained at the end of the reaction was refluxed with ethyl acetate for 4-5 h and removed from monomer residue and catalyst. The average molecular weight of the resulting aliphatic polyester was measured by GPC at 25700 Da.

Example 27

5 g of glycolic acid was weighed and placed in the reaction medium along with trifluoromethanesulfonic acid catalyst calculated as 1% mol of monomer, and then 37.5 ml anisole was added and the water produced in the reaction medium was distilled off by stirring for 30 h at the boiling point of the solvent. Dean stark apparatus and/or a similar apparatus was/were employed in order to stabilize the amount of solvent in reaction medium and distill the water off. The solid polymer obtained at the end of the reaction was refluxed with ethyl acetate for 4-5 h and removed from monomer residue and catalyst. The average molecular weight of the resulting aliphatic polyester was measured by GPC at 33000 Da.

Example 28

5 g of glycolic acid was weighed and placed in the reaction medium along with trifluoromethanesulfonic acid catalyst calculated as 1% mol of monomer, and then 150 ml anisole was added and the water produced in the reaction medium was distilled off by stirring for 30 h at the boiling point of the solvent. Dean stark apparatus and/or a similar apparatus was/were employed in order to stabilize the amount of solvent in reaction medium and distill the water off. The solid polymer obtained at the end of the reaction was refluxed with ethyl acetate for 4-5 h and removed from monomer residue and catalyst. The average molecular weight of the resulting aliphatic polyester was measured by GPC at 32000 Da.

It was observed that anisole gave the best results among the solvents tried in the studies. Moreover, a white PGA with high molecular weight was obtained in a reaction medium for 30 h with triflic acid being used as the catalyst.

REFERENCES

1. Soni, S., Gupta, H., Kumar, N., Nishad, D. K., Mittal, G., Bhatnagar, A. Recent Patents on Biomedical Engineering. (2010) 3, 30-40.
2. Singh, V., Tiwari, M. International Journal of Polymer Science. (2010) 2010, 1-23.
3. Ha, T. K., Blom, C. E., Günthard, H. H. Journal of Molecular Structure. (1981) 85, 285-292.
4. Shen, K., Yang, S. Advanced Materials Research. (2013) 821-822, 1023-1026.
5. Montes de Oca, H., Ward, I. M. Polymer. (2006) 47, 7070-7077.
6. Gilding, D. K., Reed, A. M. Polymer. (1979) 20, 1459-1464.
7. Cooper, D. R., Sutton, G. J., Tighe, B. J. Journal of Polymer Science. (1973) 2045-2056.
8. Marega, C., Marigo, A., Zannetti, R., Paganetto, G. Eur. Polym. J. (1992) 28, 1485-1486.

9. Lu, Y., Schmidt, C., Beuermann, S. Macromol. Chem. Phys. (2014) 1-5.
10. Schmidt, C., Behl, M., Lendlein, A., Beuermann, S. The Royal Society of Chemistry (2014) 4, 35099-35105.
11. Gokturk, E., Pemba, A. G., Miller, S. A. U.S. 2015/0025218 A1 (2015).
12. Hurrell, S., Cameron, R. E. Journal of Material Science: Materials in Medicine. (2001) 12, 811-816.
13. Nieuwenhuis, J. Clinical Materials. (1992) 10, 59-67.
14. Takahashi, K., Taniguchi, I., Miyamoto, M., Kimura, Y. Polymer. (2010) 41, 8725-8728.
15. Dali, S., Lefebvre, H., Gharbi, R., Fradet, A. Journal of Polymer Science: Part A: Polymer Chemistry. (2006) 44, 3025-3035.
16. Murugan, K. D., Radhika, S., Baskaran, I., Anbarasan, R. Chinese Journal of Polymer Science. (2008) 26, 393-398.
17. Kaihara, S., Matsumura, S., Mikos, A. G., Fisher. J. P. Nature Protocols. (2007) 2, 2767-2771.
18. Baez, J. E., Fernandez A. M. International Journal of Polymer Anal. Charact. (2011) 16, 269-276.
19. Gautier, E., Fuertes, P., Cassagnau, P., Pascault, J. P., Fleury, E. Journal of Polymer Science: Part A: Polymer Chemistry. (2009) 47, 1440-1449.
20. Soccio, M., Lotti, N., Finelli, L., Gazzano, M., Munari, A. Journal of Polymer Science: Part B: Polymer Physics. (2010) 48, 1901-1910.
21. Perrin, D., English, J. P. (1997)
22. Kashima, T., Kameoka, T., Higuchi, C., Ajioka, M., Yamaguchi, A. (1995) U.S. Pat. No. 5,428,126.
23. Rovshandeh, J. M., Sarboluoki, M. N. Ironian Polymer Journal. (2001) 10, 53-58.
24. Kaitian, X., Kozluca, A. Journal of Chemistry. (1996) 20, 43-53.
25. Moon, S., Deguchi, K., Miyamoto, M., Kimura, Y. Polymer International. (2004) 53, 254-258.
26. Kashima, T. (1995). "Aliphatic Polyester and Preparation Process Thereof". U.S. Pat. No. 5,428,126.
27. Moon, S. I., Lee, C. W., Miyamoto, M., Kimura, Y. Journal of Polymer Science: Part A: Polymer Chemistry. (2000) 38, 1673-1679.
28. Kim, J. H., Shin, G. I., Kim, S. H., Kim, Y. H. Korea Polymer Journal. (1997) 5, 19-25.
29. Patisson, V. A. (1976). "Polyester Solution Polycondensation Method". Patent CA 1063292 A1.
30. Y, Yoshida. (1998). "Preparation Process of Polyhydroxycarboxylic Acid". U.S. Pat. No. 5,770,683.

The invention claimed is:

1. A synthesis method of polyglycolic acid with high molecular weight and high solubility, characterized in that it comprises following steps of:
    placing glycolic acid in reaction medium which represents a solvent with a catalyst chosen from one or several of the dual systems of tin chloride ($SnCl_2$), tin chloride dihydrate ($SnCl_2.2H_2O$), zinc acetate (ZnOAc), zinc acetate dihydrate ($ZnOAc.2H_2O$), antimony trioxide ($Sb_2O_3$), p-toluenesulfonic acid (p-TSA), trifluoromethanesulfonic acid, bis(trifluoromethane)sulfonic acid, methanesulfonic acid and $SnCl_2.2H_2O$/p-TSE, wherein the amount of catalyst used in the condensation reaction is between 0.1 and 30% mol of monomer,
    using hydrophilic organic solvents for removing excessive water and monomer formed during condensation,
    mixing and boiling the mixture wherein the reaction temperature is between 0° C. and 200° C.,
    stabilizing the amount of solvent in reaction medium and distilling the water off by means of Dean stark apparatus,
    refluxing the solid polymer obtained at the end of the reaction with ethyl acetate for 4-5 hours and removing the same from monomer residue and catalyst, and
    obtaining polyglycolic acid with the molecular weight between 5000 and 60000 Da measured by gel permeation chromatography (GPC), in fine white powder form,
wherein the reaction time is between 0.1 and 48 hours.

2. A synthesis method of polyglycolic acid according to claim 1, characterized in that hydrophilic organic solvents for removing the excessive water and monomer formed during condensation is chosen from methanol, ethanol, acetone, methyl ethyl ketone, toluene and xylene.

3. A synthesis method of polyglycolic acid according to claim 1, characterized in that the solubility of the resulting aliphatic polyester in an organic solvent, hexafluoro-2-propanol (HFIP), is between 50 and 350 mg/2 mL after stirring for 12-24 hours and at 25-50° C.

4. A synthesis method of polyglycolic acid according to claim 1, characterized in that the molar amount of the $SnCl_2.2H_2O$/p-TSA in the dual system of $SnCl_2.2H_2O$/p-TSA, one of the catalysts used in the polymerization, is between 0.1 and 5.

* * * * *